J. E. SAINDON.
LOGGING HOOK.
APPLICATION FILED MAY 3, 1917.

1,272,860.

Patented July 16, 1918.

INVENTOR
Joseph E. Saindon
BY
Fred R. Sorin
ATTORNEY

UNITED STATES PATENT OFFICE.

JOSEPH E. SAINDON, OF CHEHALIS, WASHINGTON.

LOGGING-HOOK.

1,272,860.  Specification of Letters Patent.  Patented July 16, 1918.

Application filed May 3, 1917. Serial No. 166,108.

*To all whom it may concern:*

Be it known that I, JOSEPH E. SAINDON, a citizen of the United States, and a resident of Chehalis, in the county of Lewis and State of Washington, have invented certain new and useful Improvements in Logging-Hooks, of which the following is a full, true, and exact specification.

My invention relates to logging hooks, and has for its principal object: to provide an improved and novel form of logging hook, which embodies an improved means of latching the hook so that the line may not become disengaged from the hook. Another object of my device is to provide a hook in which the latch forms a point of support for the point of the hook, thereby relieving the strain on the shank of the hook.

Figure 2:
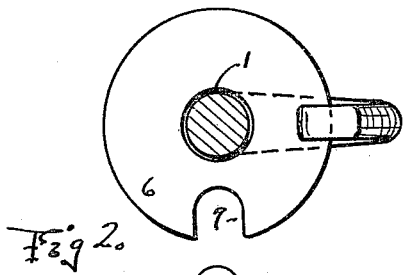
Figure 1:
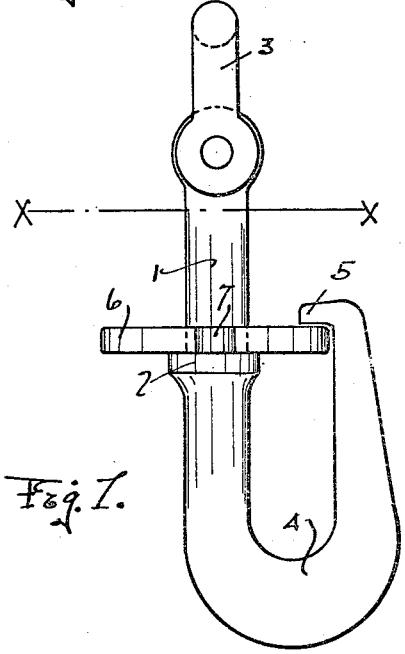
Figures 4, 5:
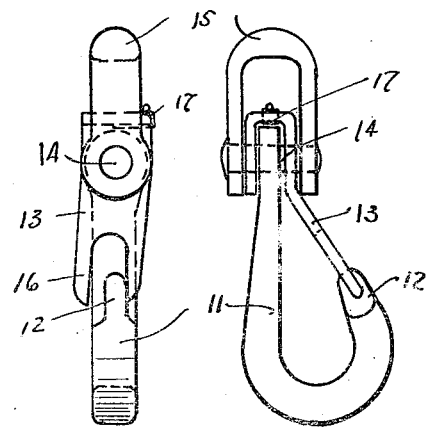
Figure 3:
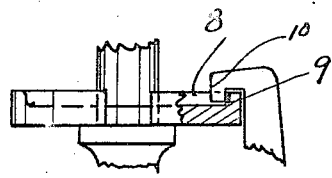

Other objects will appear as my invention is more fully explained in the following specification, illustrated in the accompanying drawings and pointed out in the appended claims:

In the drawings Figure 1 is a side elevation of my hook shown in locked position. Fig. 2 is a sectional plan on line $x$—$x$ of Fig. 1. Fig. 3 is a fragmentary view of a modified form of hook similar to that shown in Fig. 1. Fig. 4 is a front elevation of a modified form of hook. Fig. 5 is a side elevation of same.

Referring more particularly to the drawings Figs. 1 and 2, numeral 1 indicates a shank of the hook which is shouldered as at 2. A clevis 3 is pivoted to the upper end of shank 1, while the lower part of shank 1 below the shouldered portion 2 is bent in the form of a hook 4. The extreme end of hook 4 is bent over inwardly toward the shank 1 at a point somewhat above the shoulder 2. A circular lock plate 6 is loosely mounted upon the shank 1 above the shoulder 2 and when it is desired to lock the hook, the plate 6 is rotated until the niche 7 is directly beneath the point 5, at which time the lock plate may be raised above the point 5, thereby allowing a cable or chain to be hooked over the hook. The lock plate may be again placed in a locked position and the cable is thereby prevented from releasing itself from the hook.

Referring to the modified form 3, it will be noted that the lock plate is recessed on the top as at 8, thereby leaving a rim 9 along the outer edge. The point of the hook is turned downwardly as at 10, and projects below the rim 9, thereby supporting and restraining the point of the hook from being bent away from the shank of the hook.

Referring to the modified form shown in Figs. 4 and 5, numeral 11 indicates a hook having a flattened point 12. A latch 13 is swingably mounted upon a clevis pin 14, which passes through the eye of the hook, as well as a clevis 15. It will be noted that the latch 13 is forked as at 16 where it engages the point of the hook 12. A spring 17 normally holds the latch 13 so that one of the forked portions 16 is in contact with the point 12. In order to place a line in the hook 11, it is necessary to shove the line between the fork 16 and above the point 12. The latch is then forced over to the right and the line drawn down from between the forks and within the hook.

It will be noted that as long as one of the forked portions 16 is in contact with the point of the hook 12 it is impossible for the cable to become disengaged from the hook. In the many operations of logging, hooks are used extensively, and unless locked, or attached in some suitable manner, they allow the lines to become disengaged from the locks with the result that the log is frequently lost. While the applicant is aware that there are many types of logging hooks available, yet many of these hooks are not satisfactory as they become easily clogged with dirt, or in some way interfere with the operation of the lines.

While I have shown a particular form of embodiment of my invention, I am aware that many minor changes therein will readily suggest themselves to others skilled in the art, without departing from the spirit and scope of the invention, and I therefore desire to avoid being limited to the exact form shown and described.

Having described my invention, what I claim as new and desire to protect by Letters Patent, is:

1. In a device of the class described a combination of a shouldered hook, a circular shank portion extending above the said shoulder, an inwardly and downwardly extending point upon said hook, said point extending above the plane of the said shoulder, and a notched lock plate revolubly mounted upon said shanked portion, an upstanding rim around the outer periphery of said lock plate, said rim normally engaging the downwardly extending point of said hook, whereby the point of the hook is supported and restrained against opening.

2. In a device of the class described the combination of an open hook having a round shank, a shoulder intermediate the hook proper and the shank, a circular lock plate having a principal notch and slidably and revolubly mounted on said shank adjacent said shoulder, an annular upstanding rim on said lock plate, an inwardly extending and downwardly projecting point on said hook and normally engaging the said rim, whereby the point of the hook is restrained against outward and downward movement.

JOSEPH E. SAINDON.

Copies of this patent may be obtained for five cents each, by addressing the "Commissioner of Patents, Washington, D. C."